US011364790B2

(12) United States Patent
Masumoto et al.

(10) Patent No.: US 11,364,790 B2
(45) Date of Patent: Jun. 21, 2022

(54) STRAIGHTENING PLATE MOUNTING STRUCTURE AND WORK VEHICLE

(71) Applicant: KUBOTA CORPORATION, Osaka (JP)

(72) Inventors: Koji Masumoto, Sakai (JP); Satoru Yamanaka, Sakai (JP); Masafumi Oshita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 140 days.

(21) Appl. No.: 16/844,640

(22) Filed: Apr. 9, 2020

(65) Prior Publication Data
US 2020/0338978 A1 Oct. 29, 2020

(30) Foreign Application Priority Data

Apr. 25, 2019 (JP) .................. JP2019-84439

(51) Int. Cl.
*B60K 11/08* (2006.01)
*B62D 25/12* (2006.01)
(52) U.S. Cl.
CPC ......... *B60K 11/08* (2013.01); *B60Y 2200/221* (2013.01); *B62D 25/12* (2013.01)
(58) Field of Classification Search
CPC ........ B60K 11/08; B60K 13/04; B60K 11/04; B60Y 2200/221; B62D 25/12; B62D 21/02; B62D 21/03; B62D 27/06
See application file for complete search history.

(56) References Cited

U.S. PATENT DOCUMENTS

| 9,751,394 B1* | 9/2017 | Speichinger ........... B60K 11/04 |
| 2005/0211487 A1* | 9/2005 | Obe ....................... B62D 49/06 |
| | | 180/69.21 |
| 2013/0074410 A1* | 3/2013 | Berkeland ............. E02F 3/3411 |
| | | 49/142 |
| 2016/0375758 A1* | 12/2016 | Komatsu ............ F02M 35/0201 |
| | | 180/68.4 |
| 2017/0158242 A1* | 6/2017 | Matsumoto ............ B60K 26/02 |

(Continued)

FOREIGN PATENT DOCUMENTS

| EP | 1352810 A2 * | 10/2003 | ........... B62D 29/001 |
| EP | 2610147 A2 * | 7/2013 | ........... B62D 25/084 |

(Continued)

OTHER PUBLICATIONS

Office Action (Notice of Reasons for Refusal) dated May 10, 2022, by the Japanese Patent Office in corresponding Japanese Patent Application No. 2019-084439, and an English Translation of the Office Action. (7 pages).

*Primary Examiner* — James A Shriver, II
*Assistant Examiner* — Ian Bryce Shelton
(74) *Attorney, Agent, or Firm* — Buchanan Ingersoll & Rooney PC

(57) ABSTRACT

The straightening plate mounting structure includes: a support member including a bottom plate portion in which a first elongated hole and second elongated holes are formed; a left straightening plate which is formed in a plate shape having a convex portion engageable with the first elongated hole and adjusts an air flow in a hood; and a right straightening plate which is formed in a plate shape having convex portions engageable with the second elongated holes and adjusts the air flow in the hood.

17 Claims, 12 Drawing Sheets

(56) References Cited

U.S. PATENT DOCUMENTS

2018/0222532 A1* 8/2018 Waco ................... B62D 25/084
2019/0023325 A1* 1/2019 Schwalbe .............. B62D 25/12

FOREIGN PATENT DOCUMENTS

| EP | 3470310 A1 * | 4/2019 | ............. E05B 15/04 |
|----|----|----|----|
| GB | 2336662 A * | 10/1999 | ............. F28F 9/002 |
| JP | 2005280478 A | 10/2005 | |
| JP | 2005343220 A | 12/2005 | |
| JP | 2010173572 A * | 8/2010 | |
| JP | 2011255778 A | 12/2011 | |
| JP | 2017128928 A * | 7/2017 | ............. E02F 3/325 |
| JP | 2018103871 A * | 7/2018 | |
| WO | WO-2010122857 A1 * | 10/2010 | ............. B60K 11/08 |
| WO | WO-2016157651 A1 * | 10/2016 | ............. A01D 41/12 |
| WO | WO-2017168915 A1 * | 10/2017 | ............ F01N 3/2889 |

\* cited by examiner

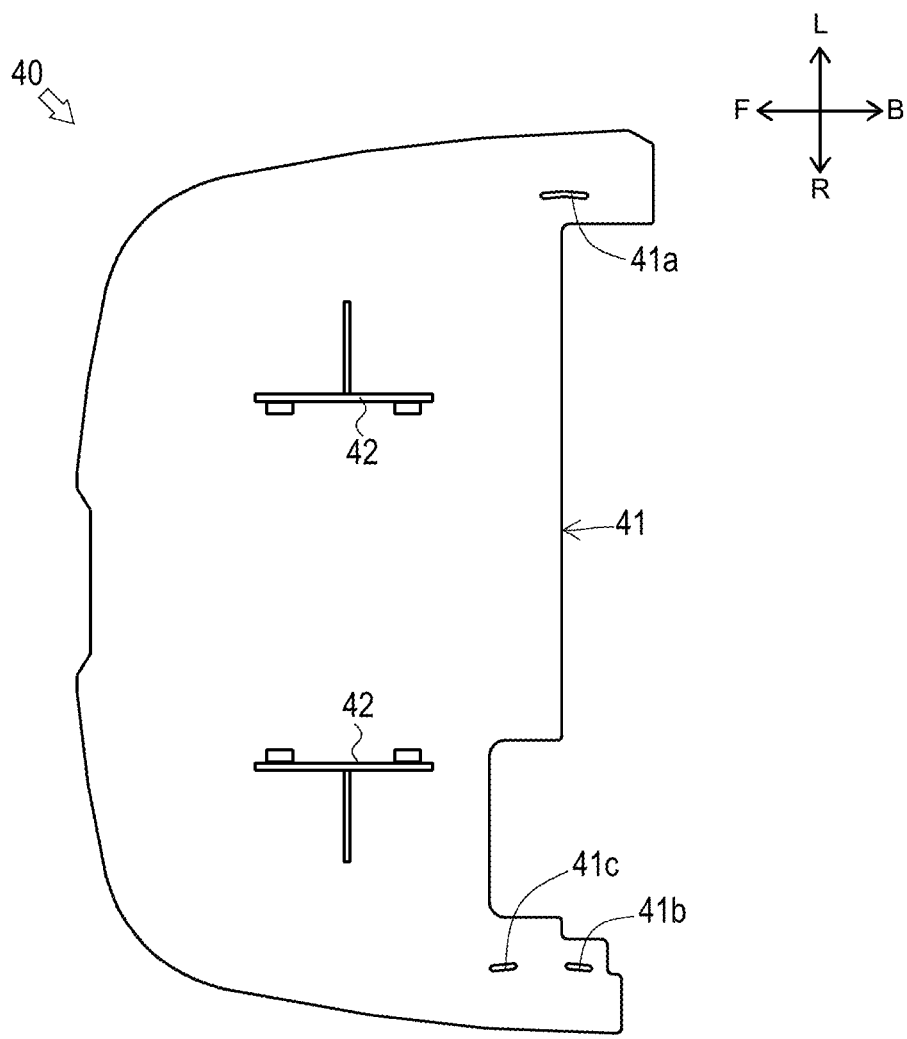

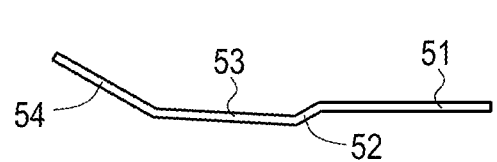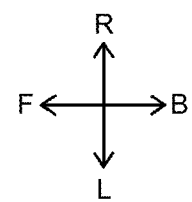
Fig. 8(a)
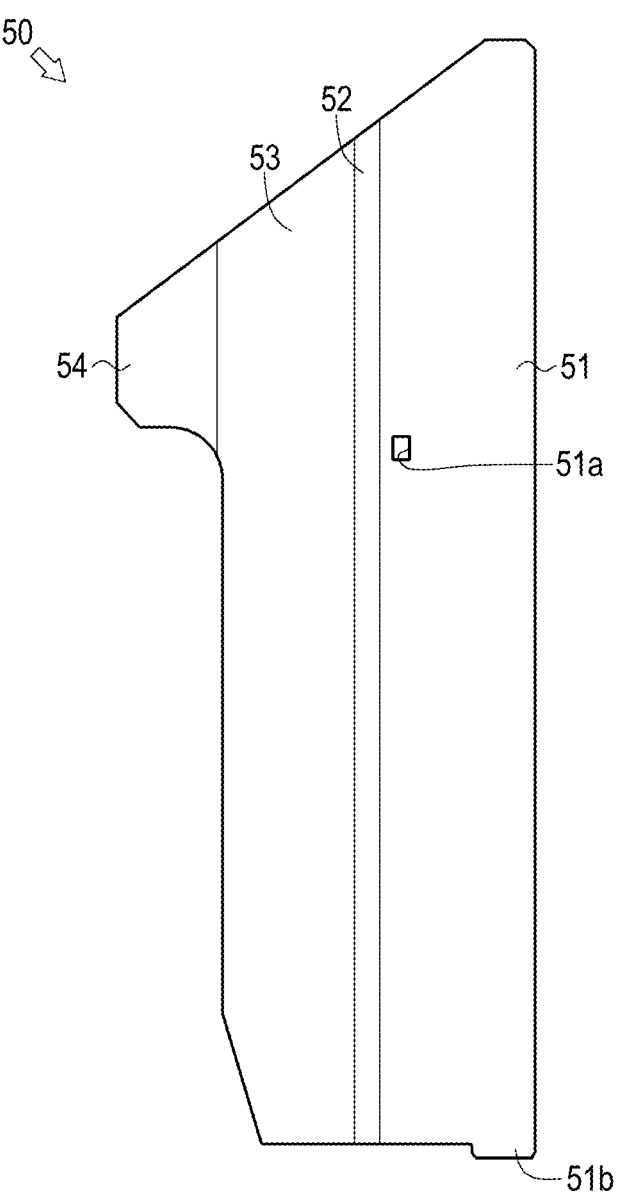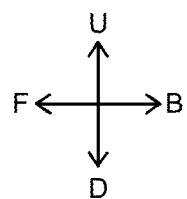
Fig. 8(b)

Fig. 11(a)
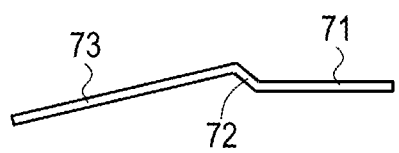
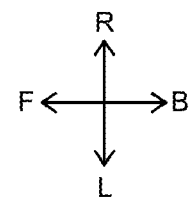
Fig. 11(b)
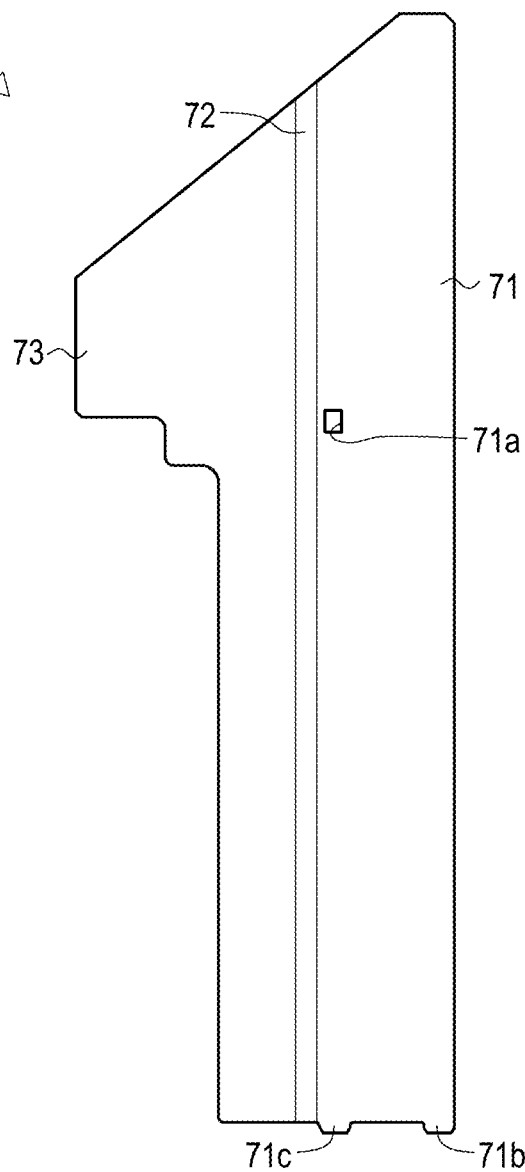
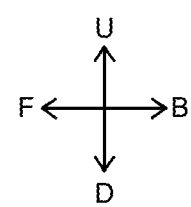

… (1)

STRAIGHTENING PLATE MOUNTING STRUCTURE AND WORK VEHICLE

TECHNICAL FIELD

The disclosure relates to a technique of a straightening plate mounting structure and a work vehicle for mounting a straightening plate for adjusting an air flow in a hood.

BACKGROUND ART

Conventionally, a technique of a straightening plate mounting structure for mounting a straightening plate for adjusting an air flow in a hood has been known. For example, the technique is described in JP 2005-343220 A.

In the mounting structure described in JP 2005-343220 A, a pair of upper and lower pivot pins is fixed to the straightening plate (right straightening plate). The straightening plate is supported by a bracket or the like via a pair of upper and lower pivot pins so as to be openable. The straightening plate is held in a closed position by a positioning unit. Thus, the straightening plate is mounted to the bracket.

However, in the straightening plate mounting structure described in JP 2005-343220 A, it is necessary to separately fix the pivot pins (a member for mounting the straightening plate) to the straightening plate. For this reason, the number of parts increases, and the configuration for mounting the straightening plate becomes complicated.

SUMMARY OF INVENTION

The disclosure has been made in view of the above situation, and the object of the disclosure is to provide a straightening plate mounting structure and a work vehicle capable of mounting a straightening plate with a simple configuration.

The problem to be solved by the disclosure is as described above. Next, a unit for solving the problem will be described.

That is, the straightening plate mounting structure according to the disclosure includes: a support member which is formed with a hole; and a straightening plate which is formed in a plate shape having a convex portion engageable with the hole and adjusts an air flow in a hood.

In the straightening plate mounting structure according to the disclosure, a plurality of the holes and the convex portions are formed.

The straightening plate mounting structure according to the disclosure further includes: a fixing member which is provided at an upper portion of the straightening plate and is fixable to the support member. The plurality of convex portions are formed at a bottom portion of the straightening plate.

In the straightening plate mounting structure according to the disclosure, the straightening plate includes a first plate portion which faces the hood and into which the fixing member is inserted, and a second plate portion which is adjacent to the first plate portion and is formed to extend toward an outside of the hood from the first plate portion.

In the straightening plate mounting structure according to the disclosure, the fixing member is formed to be positioned inward of the hood with respect to the second plate portion.

In the straightening plate mounting structure according to the disclosure, the convex portion is formed in a linear shape with a longitudinal direction extending in a predetermined direction when viewed from a depth direction of the hole, and the hole is formed in a substantially arc shape when viewed from the depth direction of the hole.

In the straightening plate mounting structure according to the disclosure, the convex portion is formed in a linear shape with a longitudinal direction extending in a predetermined direction when viewed from a depth direction of the hole, and the hole is formed in a linear shape with a longitudinal direction extending in a direction different from the longitudinal direction of the convex portion when viewed from the depth direction of the hole.

In the straightening plate mounting structure according to the disclosure, the convex portions are formed in a pair such that the longitudinal directions of the convex portions are the same direction, and the holes are formed in a pair to be inclined with respect to the longitudinal direction of the convex portions in opposite directions to each other.

Further, a work vehicle of the disclosure includes the above-described straightening plate mounting structure.

The disclosure has the following effects.

In the straightening plate mounting structure according to the disclosure, the straightening plate can be mounted with a simple configuration.

In the straightening plate mounting structure according to the disclosure, the straightening plate can be stably held.

In the straightening plate mounting structure according to the disclosure, the straightening plate can be held more stably.

In the straightening plate mounting structure according to the disclosure, it is possible to suppress that the hood is brought into contact with the fixing member when opening and closing the hood.

In the straightening plate mounting structure according to the disclosure, the width of the hole can be increased to facilitate the formation of the hole, and at the same time, the rattling of the convex portion with respect to the hole can be reduced.

In the work vehicle of the disclosure, the straightening plate can be mounted with a simple configuration.

BRIEF DESCRIPTION OF DRAWINGS

FIG. 4 is a bottom view illustrating a support member;

FIG. 8A is a plan view of the same;

FIG. 8B is a side view of the same;

FIG. 11A is a plan view of the same;

FIG. 11B is a side view of the same; and

DESCRIPTION OF EMBODIMENT

Figure 1:
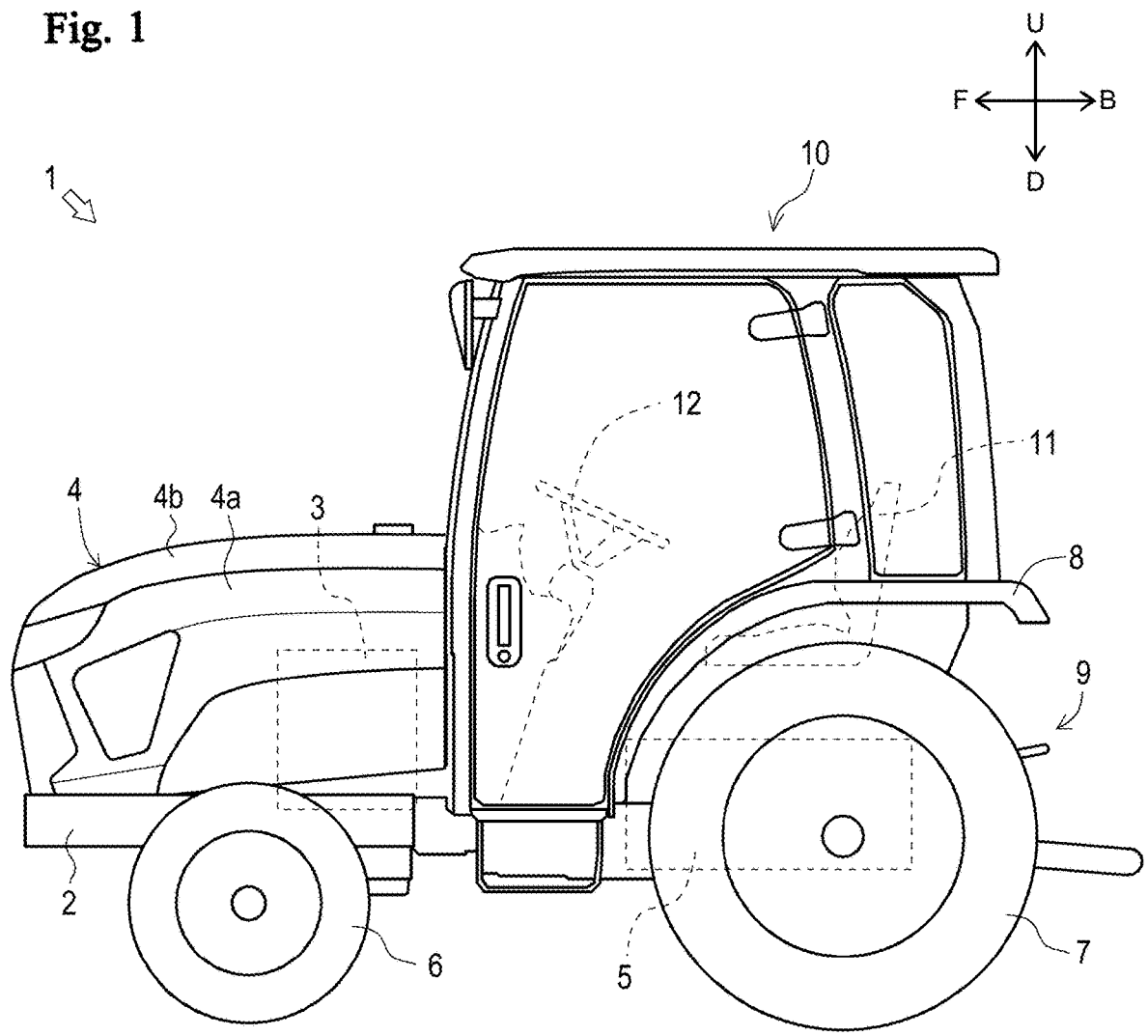
FIG. 1 is a side view illustrating an overall configuration of a tractor according to one embodiment of the disclosure.

In the following, a description is given with the directions indicated by arrows U, D, F, B, L and R in the drawing defined as upward, downward, forward, backward, leftward and rightward, respectively.

Hereinafter, a tractor 1 according to an embodiment of the disclosure will be described with reference to FIG. 1.

The tractor 1 mainly includes a body frame 2, an engine 3, a hood 4, a transmission case 5, a front wheel 6, a rear wheel 7, a fender 8, a lifting device 9, a cabin 10, a seat 11, a steering wheel 12, and the like.

The body frame 2 is a frame-shaped member formed by appropriately combining a plurality of panel members. The body frame 2 is formed in a substantially rectangular shape in plan view. The body frame 2 is provided at the front portion of the tractor 1 with the longitudinal direction of the body frame 2 extending in a front-rear direction. The engine 3 is disposed at the rear portion of the body frame 2 and is covered with the hood 4. The hood 4 includes side plates 4a disposed on the right and left outer sides of the engine 3, a top plate 4b disposed above the engine 3, and the like, and is provided to be openable. A transmission case 5 is fixed to the rear portion of the engine 3.

The front portion of the body frame 2 is supported by a pair of right and left front wheels 6 via a front axle mechanism (not illustrated). The rear portion of the transmission case 5 is supported by a pair of right and left rear wheels 7 via a rear axle mechanism (not illustrated). The pair of right and left rear wheels 7 is covered mostly with the fender 8 from above.

The rear portion of the transmission case 5 is provided with the lifting device 9. The lifting device 9 can be mounted with various work devices (for example, a cultivator). The lifting device 9 can raise and lower the mounted work device by an actuator such as a hydraulic cylinder. The power of the engine 3 can be transmitted to the lifting device 9 through a PTO (Power-Take-Off) shaft (not illustrated).

After the power of the engine 3 is shifted by a transmission (not illustrated) housed in the transmission case 5, the power can be transmitted to the front wheels 6 through the front axle mechanism, and the power can be transmitted to the rear wheels 7 through the rear axle mechanism. The front wheels 6 and the rear wheels 7 are driven to rotate by the power of the engine 3, so that the tractor 1 can run. Further, the work device mounted on the lifting device 9 can be driven by the power of the engine 3.

The cabin 10 is provided behind the engine 3. A living space on which an operator boards is formed inside the cabin 10. The seat 11 for the operator to sit on is disposed at substantially the center of the cabin 10. The steering wheel 12 for adjusting the turning angle of the front wheels 6 is disposed at the front portion of the cabin 10.

Hereinafter, the arrangement of each member in the hood 4 will be described with reference to FIG. 2.

The engine 3, a battery 21, a left straightening plate 50, a right straightening plate 70, a radiator 22, an air cleaner 23, a DPF (Diesel Particulate Filter) 24, and the like are disposed in the hood 4.

The engine 3 is disposed at the rear portion of the hood 4. The engine 3 is supported by the body frame 2.

The battery 21 supplies power to a power supply target (for example, an air conditioner or a work light) of the tractor 1. The battery 21 is disposed at the front portion of the hood 4. The battery 21 is placed and fixed on a support member 40 described below.

The left straightening plate 50 and the right straightening plate 70 adjust the air flow in the hood 4. The left straightening plate 50 and the right straightening plate 70 are disposed behind the battery 21. The configurations of the left straightening plate 50 and the right straightening plate 70 will be described later.

The radiator 22 is for cooling the cooling water of the engine 3. The radiator 22 is disposed immediately behind the left straightening plate 50 and the right straightening plate 70. The radiator 22 includes a radiator fan 22a, a shroud 22b, and the like.

The radiator fan 22a sends air rearward. The radiator fan 22a is driven by transmitting power from the engine 3 through a shaft 3a of the engine 3 and the like. The shroud 22b is formed so as to cover the radiator fan 22a from the outer peripheral side.

The radiator 22 configured as described above drives the radiator fan 22a to suck air in front and exchange heat with cooling water, thereby cooling the cooling water. The left straightening plate 50 and the right straightening plate 70 can adjust the flow of the air generated by driving the radiator fan 22a.

The air cleaner 23 removes dust from air and sends the air to the engine 3. The air cleaner 23 is disposed above and behind the radiator 22.

The DPF 24 is for collecting PM in exhaust gas discharged from the engine 3. The DPF 24 is disposed behind the air cleaner 23 and above the engine 3.

The tractor 1 according to this embodiment includes a mounting structure 30 for mounting the left straightening plate 50 and the right straightening plate 70 in such a hood 4.

Hereinafter, the mounting structure 30 will be described with reference to FIGS. 3 to 12.

The mounting structure 30 includes the support member 40, the left straightening plate 50, the left fixing member 60, the right straightening plate 70, and the right fixing member 80.

Figure 3:
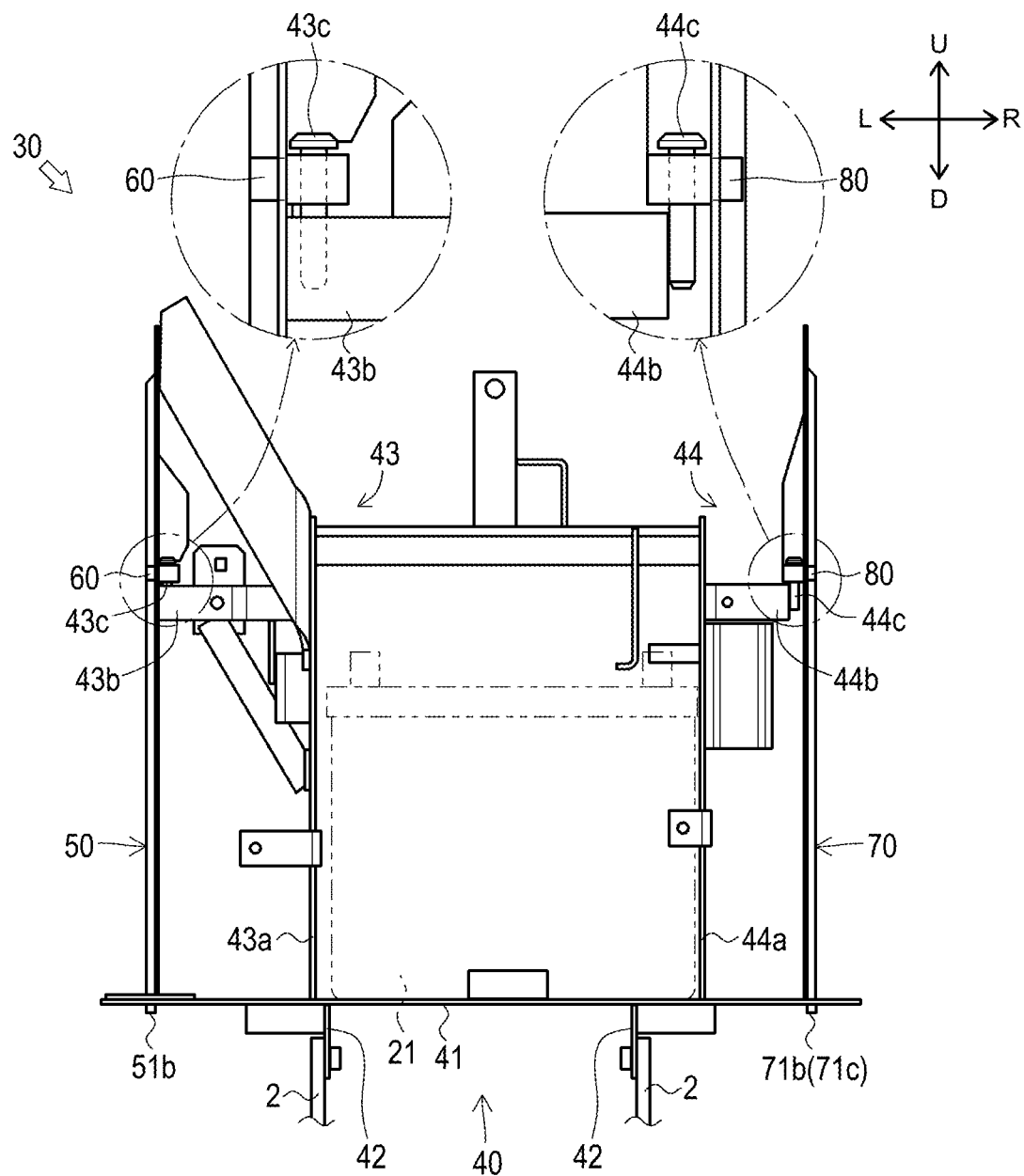
FIG. 3 is a rear view illustrating a mounting structure.

The support member 40 illustrated in FIGS. 3 and 4 is for supporting the left straightening plate 50, the right straightening plate 70, and the like which will be described later. The support member 40 is configured by appropriately combining plate members and the like. The support member 40 includes a bottom plate portion 41, a connection portion 42, a left support portion 43, and a right support portion 44.

The bottom plate portion 41 is a plate-shaped portion disposed with a plate surface directed in a vertical direction. The bottom plate portion 41 is formed in a substantially rectangular shape with the right-left direction as the longitudinal direction in bottom view. The battery 21 is placed on the middle portion in the right and left direction of the bottom plate portion 41. The bottom plate portion 41 includes a first elongated hole 41a and a pair of front and rear second elongated holes 41b and 41c.

Figure 5A:
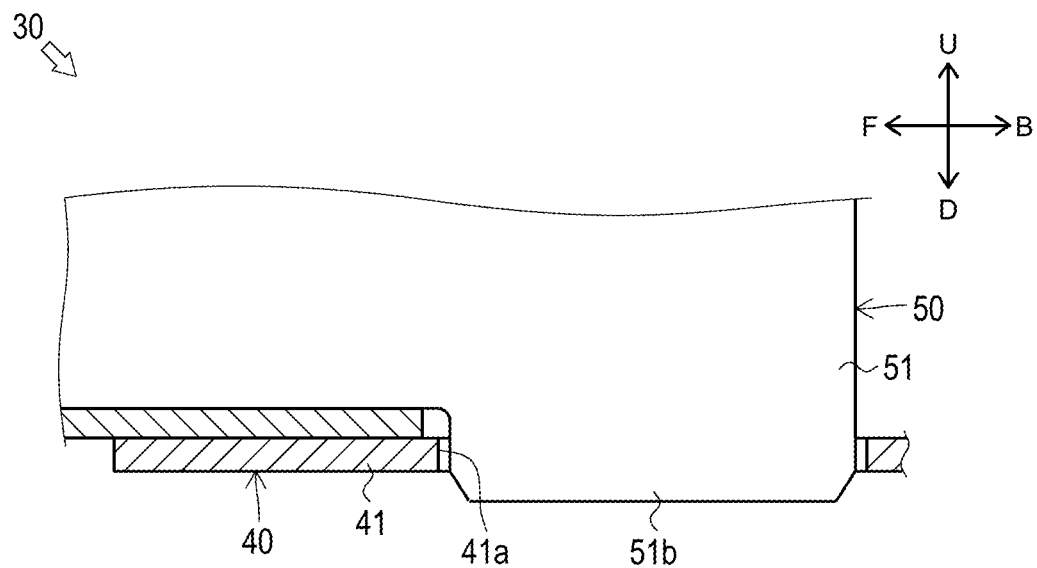
FIG. 5A is a side sectional view illustrating a left straightening plate and the support member.
Figure 5B:
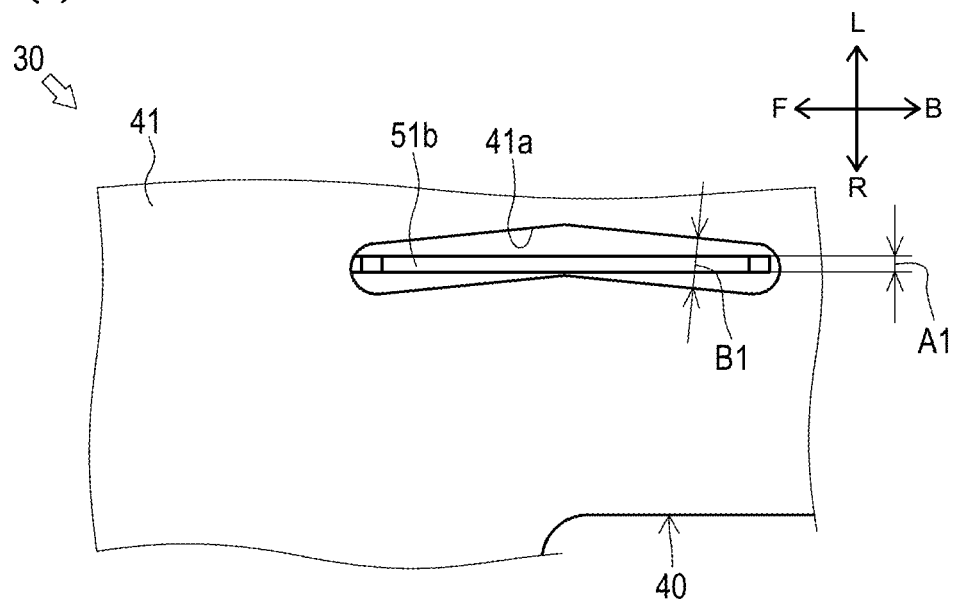
FIG. 5B is a bottom view of the same.

The first elongated hole 41a illustrated in FIGS. 4 and 5B is formed in the left rear portion of the bottom plate portion 41. The first elongated hole 41a is formed in a substantially arc shape in bottom view. Specifically, the first elongated hole 41a is formed in a substantially arc shape by a portion extending slightly rightward from the central portion in the front-rear direction toward the front and a portion extending slightly rightward from the central portion in the front-rear direction toward the rear. The front end portion and the rear end portion of the first elongated hole 41a are formed in a substantially semicircular shape in bottom view.

Figure 6A:
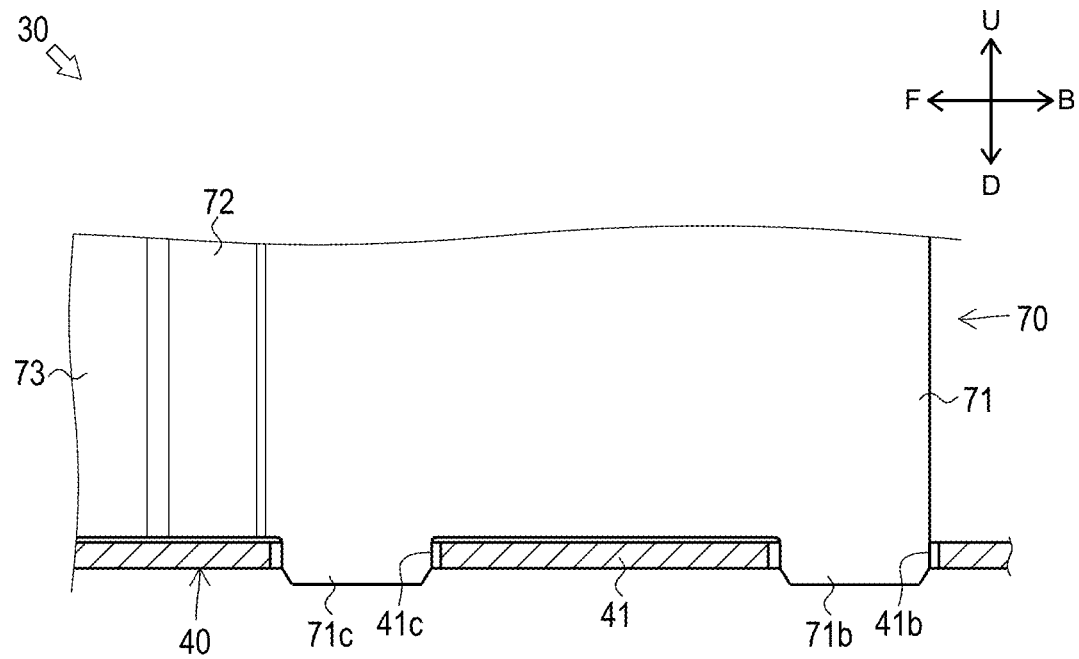
FIG. 6A is a side sectional view illustrating a right straightening plate and the support member.
Figure 6B:
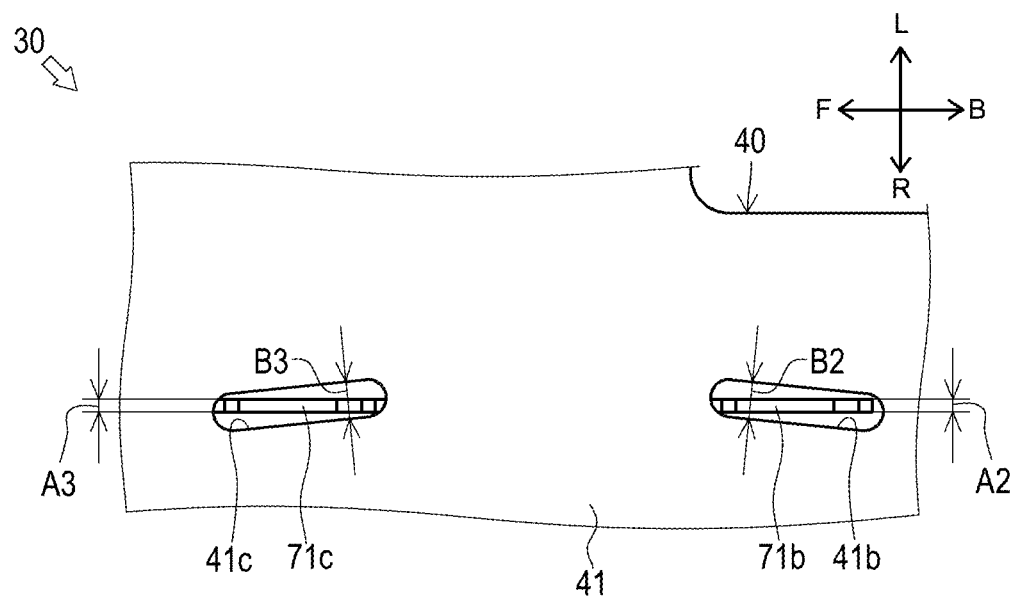
FIG. 6B is a bottom view of the same.

The pair of front and rear second elongated holes 41b and 41c illustrated in FIGS. 4 and 6B is formed in the rear right portion of the bottom plate portion 41. The pair of front and rear second elongated holes 41b and 41c is formed in a substantially linear shape with the longitudinal direction extending in a direction inclined with respect to the front-rear direction.

Specifically, the second elongated hole 41b formed on the rear side is formed so that the longitudinal direction is slightly leftward from the rear to the front. The left front end portion and the right rear end portion of the second elongated hole 41b are formed in a substantially semicircular shape in bottom view. Thus, the second elongated hole 41b is formed in a substantially track shape with the longitudinal direction extending to the left front (right rear) in bottom view.

Further, the second elongated hole 41c formed on the front side is formed so that the longitudinal direction is slightly rightward from the rear to the front. Thus, the longitudinal direction of the second elongated hole 41c (the left-right inclined direction with respect to the front-rear direction) is formed to be opposite to the longitudinal direction of the rear second elongated hole 41b. The second elongated hole 41c is formed in a substantially track shape in bottom view so as to be symmetrical with respect to the rear second elongated hole 41b in the front-rear direction.

The connection portion 42 illustrated in FIGS. 3 and 4 is a plate-shaped portion disposed with the plate surface directed in the right-left direction. The connection portion 42 is fixed to the lower surface of the bottom plate portion 41. The connection portions 42 are disposed at an interval on the right and left portions of the bottom plate portion 41. The right and left connection portions 42 are fastened to the body frame 2 via bolts or the like. Accordingly, the support member 40 is fixed to the body frame 2.

The left support portion 43 illustrated in FIG. 3 is a portion that supports the left straightening plate 50 described later. The left support portion 43 is provided at the left portion of the bottom plate portion 41. The left support portion 43 includes a rising portion 43a, an extending portion 43b, and a pin 43c.

The rising portion 43a is a portion that rises upward from the bottom plate portion 41 (the left side of the battery 21). The rising portion 43a is disposed with the plate surface directed in the right-left direction. The extending portion 43b is a portion extending leftward (right and left outer sides) from the rising portion 43a. The pin 43c is disposed with the axial direction extending in the vertical direction. The pin 43c is fixed to the left end portion of the extending portion 43b. The pin 43c has an upper portion protruding upward from the extending portion 43b.

The right support portion 44 is a portion that supports the right straightening plate 70 described later. The right support portion 44 is provided on the right portion of the bottom plate portion 41. The right support portion 44 includes a rising portion 44a, an extending portion 44b, and a pin 44c.

The rising portion 44a, the extending portion 44b, and the pin 44c are provided so as to be substantially symmetric with respect to the rising portion 43a, the extending portion 43b, and the pin 43c of the left support portion 43.

Figure 7:
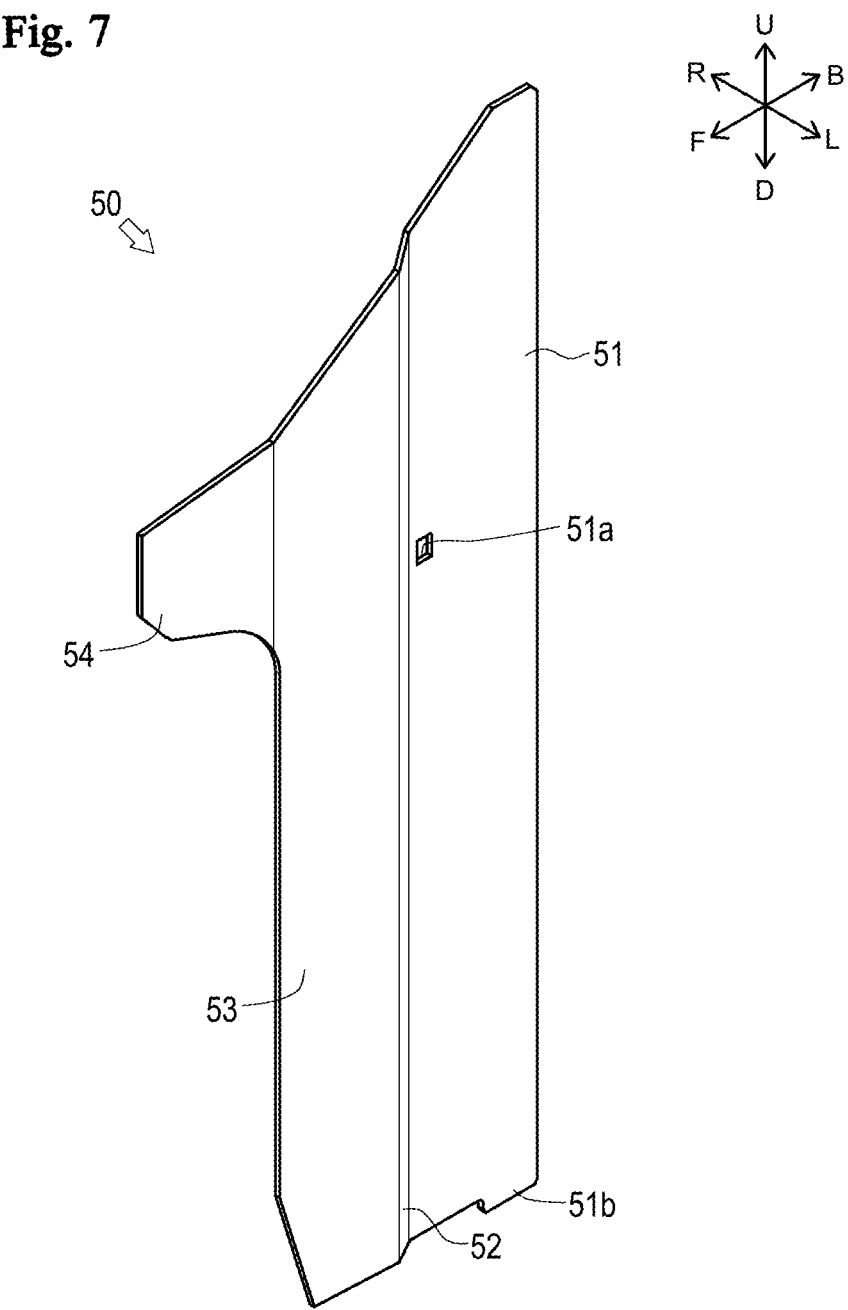
FIG. 7 is a perspective view illustrating the left straightening plate.

The left straightening plate 50 is a substantially plate-shaped member mounted on the left portion of the support member 40. The left straightening plate 50 illustrated in FIGS. 7 and 8 is formed in a substantially rectangular shape with the longitudinal direction extending in the vertical direction in side view. The left straightening plate 50 includes a first plate portion 51, a second plate portion 52, a third plate portion 53, and a fourth plate portion 54.

The first plate portion 51 is a rear end portion of the left straightening plate 50. The first plate portion 51 is disposed with the plate surface directed in the right-left direction. The first plate portion 51 includes a through hole 51a and a convex portion 51b.

The through hole 51a is a hole formed in a substantially rectangular shape in side view. The through hole 51a is formed at the upper portion of the front end portion of the first plate portion 51.

The convex portion 51b is a portion that protrudes downward from the lower surface of the first plate portion 51. The convex portion 51b is configured to be engageable with the first elongated hole 41a of the support member 40. The convex portion 51b will be described later.

The second plate portion 52 is a portion adjacent to the front side of the first plate portion 51. The second plate portion 52 is formed to extend from the first plate portion 51 to the left front. As a result, the second plate portion 52 is formed so as to gradually approach the left side plate 4a of the hood 4 (see FIG. 9).

The third plate portion 53 is a portion adjacent to the front side of the second plate portion 52. The third plate portion 53 is formed to extend from the second plate portion 52 along the left side plate 4a of the hood 4 (substantially forward in this embodiment).

The fourth plate portion 54 is a portion adjacent to the front side of the third plate portion 53. The fourth plate portion 54 is formed to extend from the third plate portion 53 to the right front.

The left straightening plate 50 configured as described above is configured (the first plate portion 51 to the fourth plate portion 54 are formed) by appropriately bending a single plate-shaped member having the convex portion 51b.

Figure 9:
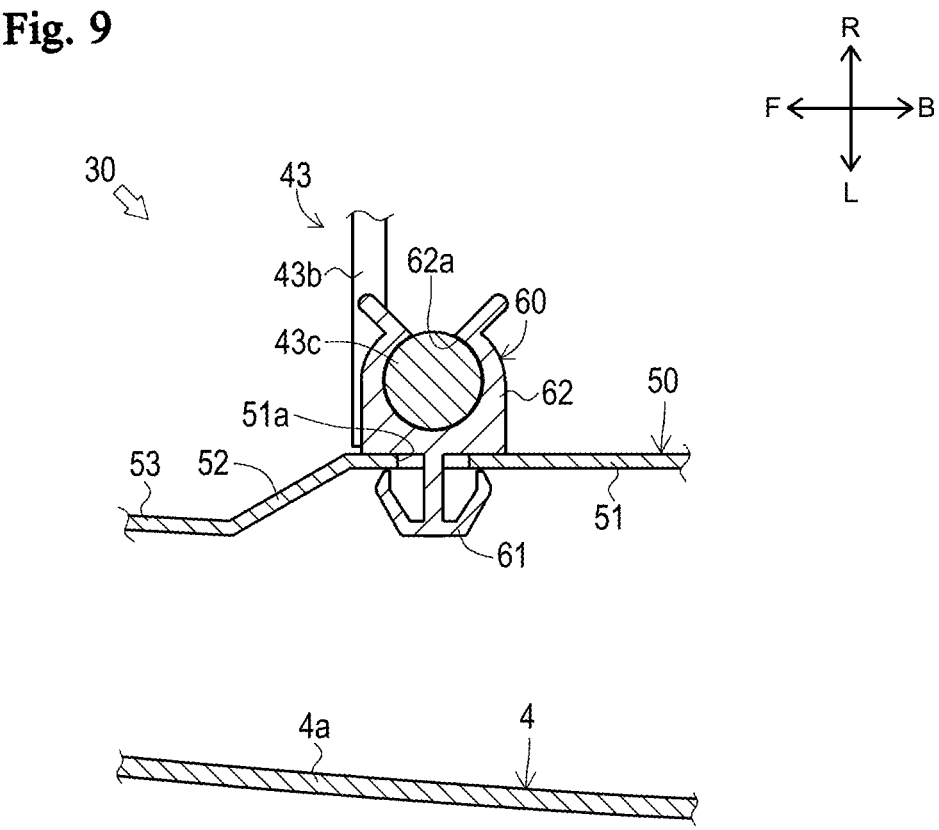
FIG. 9 is a plan sectional view illustrating a left fixing member.

The left fixing member 60 illustrated in FIGS. 3 and 9 is for holding the left straightening plate 50. The left fixing member 60 is configured of, for example, a resin so as to be elastically deformable. The left fixing member 60 includes an insertion portion 61 and a fixing portion 62.

The insertion portion 61 is a left portion of the left fixing member 60. The insertion portion 61 is formed in a substantially E shape in plan view. The insertion portion 61 is inserted from the right into the through hole 51a of the left straightening plate 50, and is positioned on the left side (right and left outer sides) of the left straightening plate 50. The right-left position of the left end portion of the insertion portion 61 are substantially the same as the right-left position of the left front end of the second plate portion 52 of the left straightening plate 50.

The fixing portion 62 is the right portion of the left fixing member 60. The fixing portion 62 is formed in a substantially C shape in plan view with an opening 62a directed to the right so as to be engageable with the pin 43c of the left support portion 43.

Figure 10:
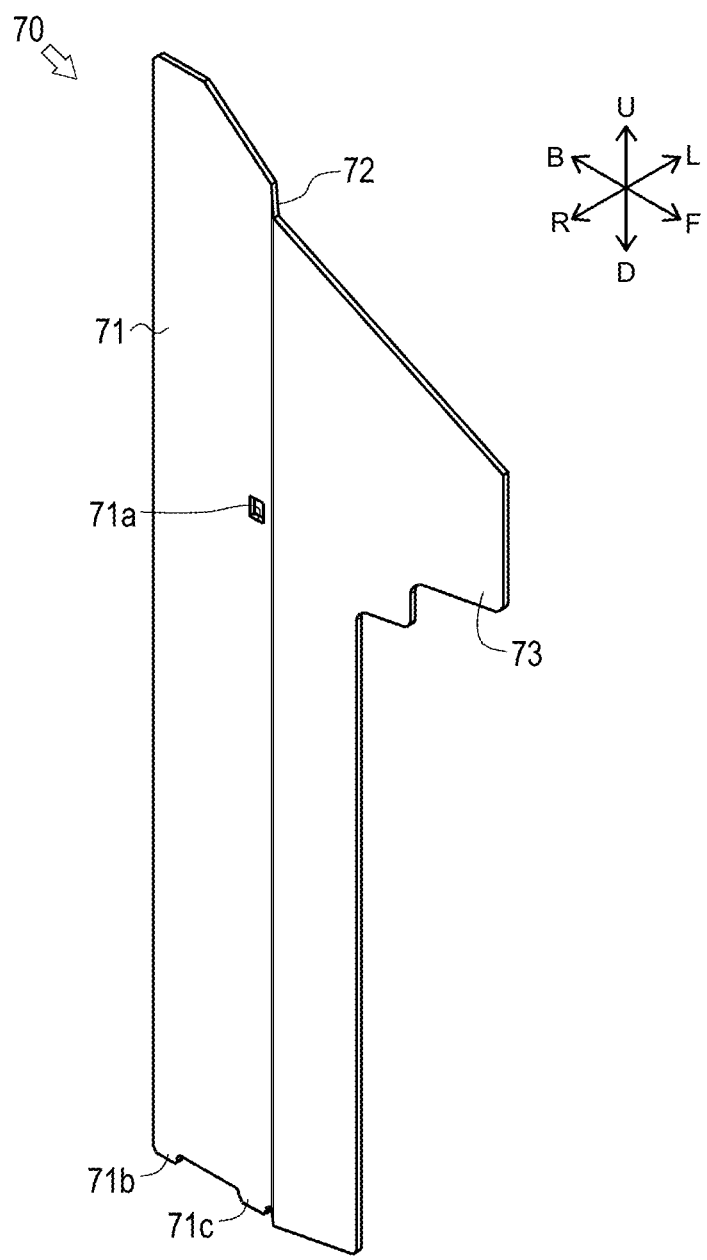
FIG. 10 is a perspective view illustrating the right straightening plate.

The right straightening plate 70 illustrated in FIGS. 3, 10, and 11 is a substantially plate-shaped member mounted on the right portion of the support member 40. The right straightening plate 70 is formed in a substantially rectangular shape with the longitudinal direction extending in the vertical direction in side view. The right straightening plate 70 is disposed to face the left straightening plate 50 with the left support portion 43 and the right support portion 44 of the support member 40 interposed therebetween. The right straightening plate 70 includes a first plate portion 71, a second plate portion 72, and a third plate portion 73.

The first plate portion 71 illustrated in FIGS. 10 and 11 is the rear end portion of the right straightening plate 70. The first plate portion 71 is disposed with the plate surface directed in the right-left direction. The first plate portion 71 includes a through hole 71a and a pair of front and rear convex portions 71b and 71c.

The through hole 71a is a hole formed in a substantially rectangular shape in side view. The through hole 71a is formed at the upper portion of the front end portion of the first plate portion 71.

The pair of front and rear convex portions 71b and 71c are portions that protrude downward from the lower surface of the first plate portion 71. The convex portions 71b and 71c are configured to be engageable with the second elongated holes 41b and 41c. The convex portions 71b and 71c will be described later.

The second plate portion 72 is a portion adjacent to the front side of the first plate portion 71. The second plate portion 72 is formed so as to extend from the first plate portion 71 to the front right. As a result, the second plate portion 72 is formed so as to gradually approach the right side plate 4a of the hood 4 (see FIG. 12).

The third plate portion 73 is a portion adjacent to the front side of the second plate portion 72. The third plate portion 73 is formed to extend to the left front from the second plate portion 72.

The right straightening plate 70 configured as described above is configured (the first plate portion 71 to the third plate portion 73 are formed) by appropriately bending a single plate-shaped member having the convex portions 71b and 71c.

Figure 12:
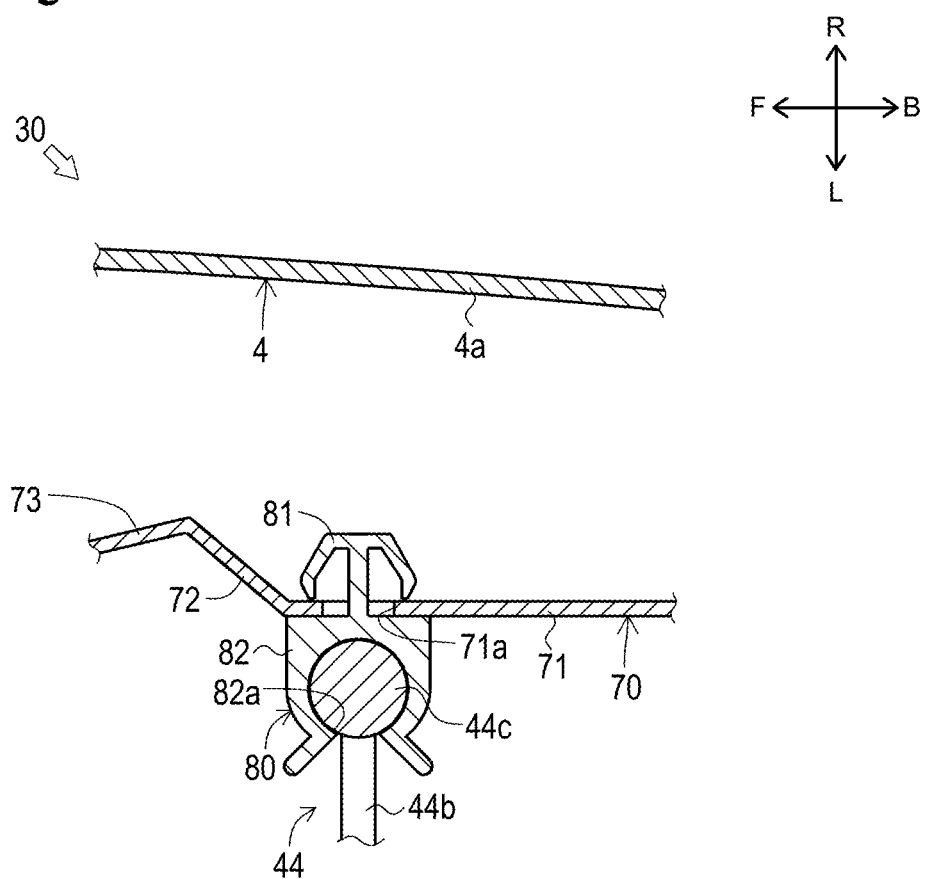
FIG. 12 is a plan sectional view illustrating a right fixing member.

The right fixing member 80 illustrated in FIGS. 3 and 12 is for holding the right straightening plate 70. The right fixing member 80 is configured of, for example, a resin so as to be elastically deformable. The right fixing member 80 includes an insertion portion 81 and a fixing portion 82 formed in the same shape as the insertion portion 61 and the fixing portion 62 of the left fixing member 60.

The insertion portion 81 is inserted into the through hole 71a of the right straightening plate 70 from the left, and is positioned on the right side (right and left outer sides) of the right straightening plate 70. The right end portion of the insertion portion 81 is positioned to the left (right and left inner sides) of the right front end of the second plate portion 72 of the right straightening plate 70. The fixing portion 82 is disposed with the opening 82a directed to the left.

The left fixing member 60 and the right fixing member 80 configured as described above are fixed to the straightening plates 50 and 70 when the insertion portions 61 and 81 are inserted into the through holes 51a and 71a of the first plate portions 51 and 71 before the left and right straightening plates 50 and 70 are mounted on the support member 40. Thus, the left and right fixing members 60 and 80 are provided at the upper portions (at positions higher than the vertically central portions) of the left and right straightening plates 50 and 70.

Hereinafter, with reference to FIGS. 5A, 5B, 6A, and 6B, the convex portion 51b of the left straightening plate 50 and the convex portions 71b and 71c of the right straightening plate 70 will be described.

The convex portion 51b of the left straightening plate 50 illustrated in FIGS. 5A and 5B is formed in a substantially rectangular shape with the longitudinal direction extending in the front-rear direction in side view. Further, the convex portion 51b is formed in a linear shape extending in the front-rear direction in bottom view. The convex portion 51b is formed from the rear end of the first plate portion 51 to the middle portion in the front-rear direction (see FIG. 8B). The width of the convex portion 51b in the longitudinal direction is appropriately set so that the front end portion and the rear end portion can be brought into contact with the first elongated hole 41a of the support member 40. Further, the vertical width of the convex portion 51b (the protruding width from the lower surface of the first plate portion 51) is formed to be larger than the depth (vertical width) of the first elongated hole 41a. The width (the width in the lateral direction) B1 of the first elongated hole 41a of the support member 40 is formed so as to be larger than a thickness A1 of the convex portion 51b (about three times in this embodiment).

The left straightening plate 50 according to this embodiment is configured of a single panel member including the convex portion 51b.

The convex portion 71b on the rear side of the right straightening plate 70 illustrated in FIGS. 6A and 6B is formed in a substantially rectangular shape with the longitudinal direction extending in the front-rear direction in side view. Further, the convex portion 71b is formed in a linear shape extending in the front-rear direction in bottom view. The convex portion 71b is formed at the rear end of the first plate portion 71. The width of the convex portion 71b in the longitudinal direction is appropriately set so that the front end portion and the rear end portion can be brought into contact with the rear second elongated hole 41b of the support member 40. Further, the vertical width (the protruding width from the lower surface of the first plate portion 71) of the convex portion 71b is formed to be larger than the depth (vertical width) of the second elongated hole 41b. A width (the width in the lateral direction) B2 of the second elongated hole 41b of the support member 40 is formed so as to be larger than a thickness A2 of the convex portion 71b (to be about three times in this embodiment).

The front convex portion 71c of the right straightening plate 70 is formed at the front end portion of the first plate portion 71 and below the through hole 71a (see FIG. 11B). The convex portion 71c is formed to have substantially the same shape as the rear convex portion 71b. The width of the convex portion 71c in the longitudinal direction is appropriately set so that the front end portion and the rear end portion can be brought into contact with the front second elongated hole 41c of the support member 40. Further, the vertical width of the convex portion 71c is formed to be larger than the depth (vertical width) of the second elongated hole 41c. A width (the width in the lateral direction) B3 of the second elongated hole 41c of the support member 40 is formed so as to be larger than a thickness A3 of the convex portion 71c (to be about three times in this embodiment).

The right straightening plate 70 according to this embodiment is configured of a single panel member including such convex portions 71b and 71c.

Hereinafter, a procedure for mounting the left and right straightening plates 50 and 70 in the mounting structure 30 configured as described above will be described. First, a procedure for mounting the left straightening plate 50 will be described.

When the left straightening plate 50 is mounted, first, the convex portion 51b of the left straightening plate 50 illustrated in FIGS. 5A and 5B is engaged with the first elongated hole 41a of the support member 40 from above. At this time, the left straightening plate 50 is inclined (the upper portion is inclined right and left outward with respect to the lower portion) so that the left fixing member 60 (see FIG. 3) does not interfere with the pin 43c, and the convex portion 51b is engaged with the first elongated hole 41a. Accordingly, the convex portion 51b is disposed in the first elongated hole 41a such that the front end portion and the rear end portion can be brought into contact with the front end and the rear end of the first elongated hole 41a. In addition, the convex portion 51b is disposed such that the central portion in the front-rear direction is closest to the right side surface (central portion in the front-rear direction) of the first elongated hole 41a, and is disposed so as to be able to be brought into contact with the right side surface of the first elongated hole 41a. In this manner, the convex portion 51b is disposed so as to be able to be brought into contact with the first elongated hole 41a at three points (the front end portion, the rear end portion, and the central portion in the front-rear direction).

Further, when the first elongated hole 41a is formed in a substantially circular arc shape in bottom view, in the convex portion 51b, the front end portion and the rear end portion can be brought into contact with the left side surface of the first elongated hole 41a, and the central portion in the front-rear direction can be brought into contact with the right side surface of the first elongated hole. The front end portion and the rear end portion of the convex portion 51b are brought into contact with the first elongated hole 41a from the right. The central portion in the front-rear direction of the convex portion 51b is brought into contact with the first elongated hole 41a from the left. In this way, the direction in which the front end portion and the rear end portion of the convex portion 51b can be brought into contact with the first elongated hole 41a is opposite to the direction in which the central portion in the front-rear direction of the convex portion 51b can be brought into contact with the first elongated hole 41a, thereby the convex portion 51b can be sandwiched by the first elongated hole 41a from the right and left to hold the left straightening plate 50. Thereby, it is possible to reduce the rattling of the convex portion 51b with respect to the first elongated hole 41a.

After the convex portion 51b is engaged with the first elongated hole 41a, the left straightening plate 50 is pressed rightward. Accordingly, the fixing portion 62 of the left fixing member 60 is elastically deformed to be pressed against the pin 43c of the left support portion 43 to open the opening 62a, and the fixing portion 62 is fitted to the pin 43c as illustrated in FIG. 9. Thus, the left fixing member 60 is fixed to the pin 43c. Accordingly, the left straightening plate 50 can be held by the support member 40 (pin 43c). Thus, the left straightening plate 50 is completely mounted. Accordingly, the left straightening plate 50 can be mounted without using a tool.

Next, a procedure for mounting the right straightening plate 70 will be described.

First, the convex portions 71b and 71c of the right straightening plate 70 illustrated in FIGS. 6A and 6B are engaged with the second elongated holes 41b and 41c of the support member 40 from above. At this time, the right straightening plate 70 is inclined (the upper portion is inclined right and left outward with respect to the lower portion) so that the right fixing member 80 (see FIG. 3) does not interfere with the pin 44c, and the convex portions 71b and 71c are engaged with the second elongated holes 41b and 41c, respectively. Accordingly, the rear convex portion 71b is disposed in the second elongated hole 41b such that the front end portion and the rear end portion can be brought into contact with the front end portion and the rear end portion of the rear second elongated hole 41b. Further, the front convex portion 71c is disposed in the second elongated hole 41c such that the front end portion and the rear end portion can be brought into contact with the front end portion and the rear end portion of the front second elongated hole 41c. Thus, when each of the convex portions 71b and 71c is disposed to be able to be brought into contact with the second elongated holes 41b and 41c at two points (the front end portion and the rear end portion, a total of four points), it is possible to reduce the rattling of the convex portions 71b and 71c with respect to the second elongated holes 41b and 41c, respectively.

Next, the fixing portion 82 of the right fixing member 80 is pressed to the left, so as to be fitted to the pin 44c of the right support portion 44 as illustrated in FIG. 12. Accordingly, the right fixing member 80 is fixed to the pin 44c. Thus, the right straightening plate 70 can be held by the support member 40 (pin 44c). Thus, the right straightening plate 70 is completely mounted. Accordingly, the right straightening plate 70 can be mounted without using a tool.

The left straightening plate 50 according to this embodiment is configured of a single panel member including the convex portion 51b which is engageable with the first elongated hole 41a of the support member 40. Further, the right straightening plate 70 is configured of a single panel member including the convex portions 71b and 71c which are engageable with the second elongated holes 41b and 41c of the support member 40, respectively. Accordingly, the left and right straightening plates 50 and 70 can be engaged with the support member 40 without fixing additional members to the left and right straightening plates 50 and 70. Accordingly, the number of components can be reduced, and the straightening plate can be mounted with a simple configuration. Further, it is possible to omit the operation of fixing members to the left and right straightening plates 50 and 70.

Here, in this embodiment, since the left straightening plate 50 illustrated in FIG. 5A is configured of a relatively thin panel member, the thickness A1 of the convex portion 51b is relatively thin (for example, about 1 mm). As described above, when the thickness A1 of the convex portion 51b is relatively thin, due to the convenience of processing, it may be difficult to form the first elongated hole 41a so as to have the same width as the thickness A1. In this regard, in this embodiment, the first elongated hole 41a is formed in a substantially arc shape in bottom view, and the left straightening plate 50 is held so as to sandwich the convex portion 51b from the right and left. Accordingly, the width B1 of the first elongated hole 41a can be made larger than the thickness A1 of the convex portion 51b so as to easily form the first elongated hole 41a, and the rattling of the convex portion 51b with respect to the first elongated hole 41a can be reduced. Further, the convex portion 51b is brought into contact with the first elongated hole 41a at a point, and it is possible to suppress the coating or the like of the left straightening plate 50 and the support member 40 from peeling off (the peeling range is made smaller than the case of surface contact).

In this embodiment, since the right straightening plate 70 illustrated in FIG. 6A is also configured of a relatively thin panel member similarly to the left straightening plate 50, the thicknesses A2 and A3 of the convex portions 71b and 71c are relatively thin (for example, about 1 mm). Therefore, in this embodiment, the longitudinal direction of the second elongated holes 41b and 41c extends in a direction different from the longitudinal direction (front-rear direction) of the convex portions 71b and 71c. Accordingly, the widths B2 and B3 of the second elongated holes 41b and 41c are made larger than the thicknesses A2 and A3 of the convex portions 71b and 71c, so that the second elongated holes 41b and 41c can be easily formed, respectively. In addition, the convex portions 71b and 71c are brought into contact with the second elongated holes 41b and 41c respectively at points, and it is possible to suppress the coating or like of the right straightening plate 70 and the support member 40 from peeling off.

Here, when the convex portions 71b and 71c come into contact (one-sided contact) with the substantially linear second elongated holes 41b and 41c at points, a force of rotating in bottom view acts on the convex portions 71b and 71c. The direction of the force is determined by the longitudinal direction of the second elongated holes 41b and 41c (the direction inclined with respect to the longitudinal direction of the convex portions 71b and 71c).

Therefore, in this embodiment, the second elongated holes 41b and 41c are formed such that the longitudinal directions of the second elongated holes 41b and 41c are opposite to each other. Accordingly, the forces acting on the convex portions 71b and 71c can be canceled with each other, and the right straightening plate 70 can be stably held. Further, in this embodiment, the second elongated holes 41b and 41c are formed so as to be symmetrical in the front-rear direction. Accordingly, the forces acting on the convex portions 71b and 71c can be effectively canceled, and the right straightening plate 70 can be held more stably.

Incidentally, the left and right straightening plates 50 and 70 are removed from the support member 40 in a reverse procedure to that at the time of mounting. That is, the left straightening plate 50 is pressed to the left, and the left fixing member 60 is removed from the pin 43c of the left support portion 43. The left straightening plate 50 is lifted upward to release the engagement state with the first elongated hole 41a and is removed from the support member 40. Further, the right straightening plate 70 is pressed to the right, and the right fixing member 80 is removed from the pin 44c of the right support portion 44. The right straightening plate 70 is lifted upward to release the engagement state with the second elongated holes 41b and 41c and is removed from the support member 40.

Figure 2:
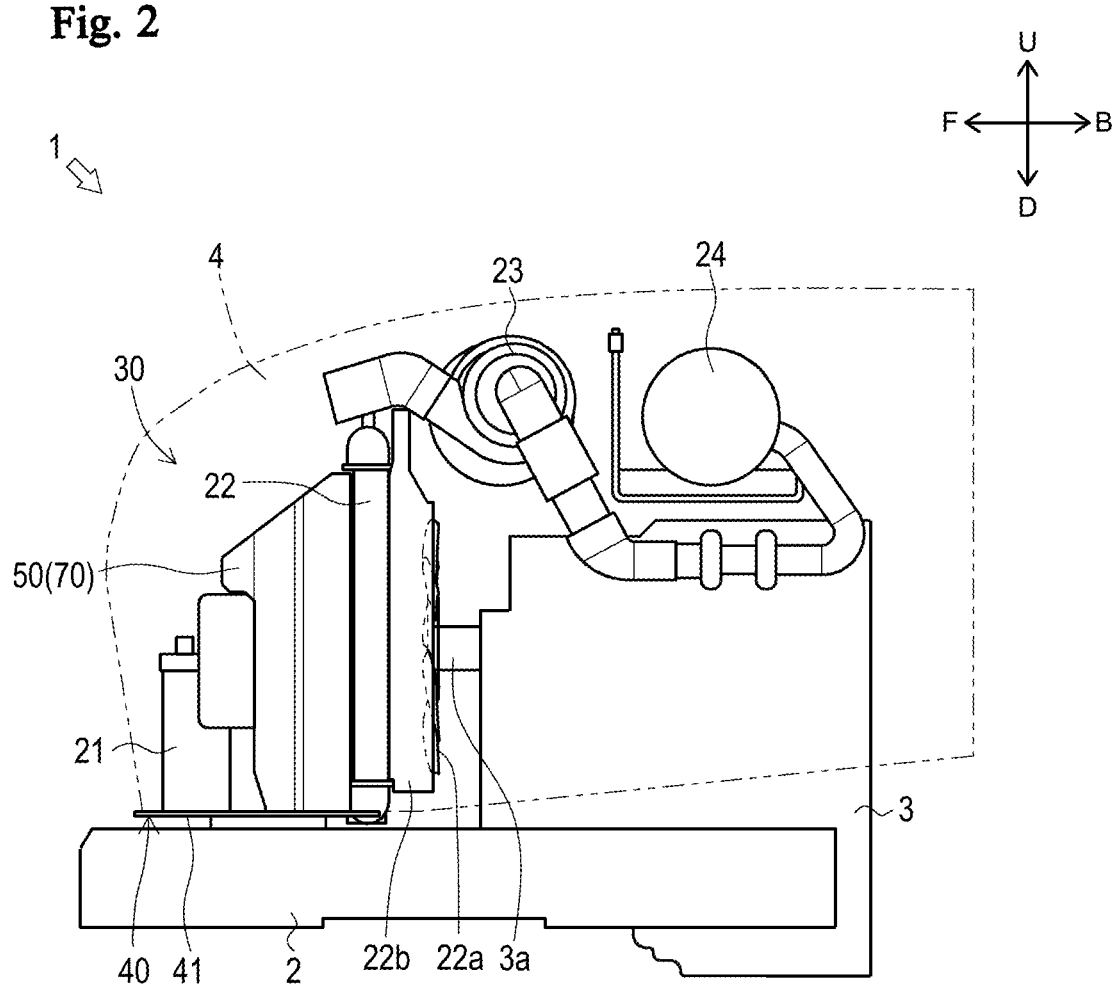
FIG. 2 is a side view illustrating an inner configuration of a hood.

Here, when mounting and removing the left straightening plate 50 and the right straightening plate 70, the hood 4 illustrated in FIG. 2 is opened and closed (rock up and down around the rear upper end). The inner surface of the side plate 4a (see FIG. 1) of the hood 4 is mounted with a sponge (not illustrated) for filling a gap from the shroud 22b of the radiator 22. The sponge slides with respect to the straightening plates 50 and 70 when the hood 4 is opened and closed.

In this embodiment, as illustrated in FIGS. 9 and 12, the left and right fixing members 60 and 80 are disposed at the front end portions of the first plate portions 51 and 71 of the straightening plates 50 and 70, respectively (immediately behind the second plate portions 52 and 72). Accordingly, the sponge of the hood 4 can be pressed outward to be opened by the second plate portions 52 and 72 formed to protrude right and left outward from the first plate portions 51 and 71, respectively, when the hood 4 is opened and closed. Accordingly, it becomes difficult for the sponge to be caught by the left and right fixing members 60 and 80 when the hood 4 is opened and closed.

As described above, the mounting structure 30 according to this embodiment includes the support member 40 in which the first elongated hole 41a and the second elongated holes 41b and 41c (holes) are formed, and the left and right straightening plates 50 and 70 (straightening plates) which are formed in a plate shape having the convex portions 51b, 71b, and 71c engageable with the first elongated hole 41a and the second elongated holes 41b and 41c and adjust the air flow in the hood 4.

With this configuration, the left and right straightening plates 50 and 70 can be mounted with a simple configuration.

Further, a plurality of the second elongated holes 41b and 41c and a plurality of the convex portions 71b and 71c are formed.

With this configuration, the number of engaging portions can be increased to reduce the rattling of the right straightening plate 70, and the right straightening plate 70 can be held stably.

The right fixing member 80 (fixing member) is further provided which is provided at the upper portion of the right straightening plate 70 and is fixable to the support member 40. The plurality of convex portions 71b and 71c are formed at the bottom portion of the right straightening plate 70.

With this configuration, the right straightening plate 70 can be supported at three or more points by the support member 40 and the right fixing member 80. In addition, the right straightening plates 70 can be supported up and down (at the top portion and the bottom portion) with good balance. Accordingly, the right straightening plate 70 can be held more stably.

The right straightening plate 70 includes the first plate portion 71 which is opposed to the hood 4 and into which the right fixing member 80 is inserted, and the second plate portion 72 which is adjacent to the first plate portion 71 and is formed to extend toward the outside of the hood 4 from the first plate portion 71.

With this configuration, it is possible to suppress that the hood 4 is brought into contact with the right fixing member 80 (the sponge of the hood 4 is caught) when the hood 4 is opened and closed.

The right fixing member 80 is formed to be positioned inward (right and left inner sides) of the hood 4 with respect to the second plate portion 72.

With this configuration, the gap between the right fixing member 80 and the hood 4 can be easily secured, and thus it is possible to effectively suppress that the sponge is brought into contact with the right fixing member 80 when opening and closing the hood 4.

The convex portion 51b is formed in a linear shape with the longitudinal direction extending in a predetermined direction in bottom view (when viewed from the depth direction of the first elongated hole 41a), and the first elongated hole 41a is formed in a substantially arc shape in bottom view (when viewed from the depth direction of the first elongated hole 41a).

With this configuration, the width B1 of the first elongated hole 41a can be increased to facilitate the formation of the first elongated hole 41a, and the rattling of the convex portion 51b with respect to the first elongated hole 41a can be reduced.

The convex portions 71b and 71c are formed in a linear shape with the longitudinal direction extending in a predetermined direction in bottom view (when viewed from the depth direction of the second elongated holes 41b and 41c), and the second elongated holes 41b 41c are formed in a linear shape with the longitudinal direction extending in a direction different from the longitudinal direction of the convex portions 71b and 71c in bottom view (when viewed from the depth direction of the second elongated holes 41b and 41c).

With such a configuration, the widths B2 and B3 of the second elongated holes 41b and 41c can be increased to facilitate the formation of the second elongated holes 41b and 41c, and the rattling of the convex portions 71b and 71c with respect to the second elongated holes 41b and 41c can be reduced, respectively.

The convex portions 71b and 71c are formed in a pair such that the longitudinal directions thereof are the same direction, and the second elongated holes 41b and 41c are formed in a pair to be inclined with respect to the longitudinal direction of the convex portions 71b and 71c in opposite directions to each other.

With this configuration, the right straightening plate 70 can be stably held.

As described above, the tractor 1 (work vehicle) according to this embodiment includes the mounting structure 30.

With this configuration, the left and right straightening plates 50 and 70 can be mounted with a simple configuration.

Incidentally, the first elongated hole 41a and the second elongated holes 41b and 41c according to this embodiment are one embodiment of the hole according to the disclosure.

Further, the left and right straightening plates 50 and 70 according to this embodiment are one embodiment of the straightening plates according to the disclosure.

Further, the right fixing member 80 according to this embodiment is one embodiment of the fixing member according to the disclosure.

Further, the tractor 1 according to this embodiment is one embodiment of the work vehicle according to the disclosure.

As described above, the embodiments of the disclosure have been described. However, the disclosure is not limited to the above configuration, and various changes can be made within the scope of the invention described in the claims.

For example, the work vehicle according to this embodiment is the tractor 1, but the type of the work vehicle according to the disclosure is not limited to this. The work vehicle according to the disclosure may be another agricultural vehicle, a construction vehicle, an industrial vehicle, or the like.

One or two convex portions (one on the left straightening plate 50 and two on the right straightening plate 70) are formed on the left and right straightening plates 50 and 70. The number of the convex portions is not limited to this, and three or more convex portions may be formed.

The convex portion 51b is formed in a substantially linear shape with the longitudinal direction extending in the front-rear direction in bottom view. However, the longitudinal direction of the convex portion 51b is not limited to the front-rear direction, and may be another direction. Further, the shape of the convex portion 51b is not limited to a substantially linear shape in bottom view, and may be, for example, a substantially arc shape in bottom view.

The left and right fixing members 60 and 80 are mounted on the first plate portions 51 and 71, respectively. However, the disclosure is not limited to this, and the left and right fixing members may be mounted on other plate portions (for example, the second plate portions 52 and 72, or the like). Further, in the left and right fixing members 60 and 80, the insertion portions 61 and 81 may be positioned on the right and left outward from the second plate portions 52 and 72. Further, the left and right fixing members 60 and 80 do not necessarily need to be provided at the upper portions of the left and right straightening plates 50 and 70, and may be provided at the lower portions of the left and right straightening plates 50 and 70, respectively, for example.

The second elongated holes 41b and 41c are formed to be symmetrical in the front-rear direction. However, the disclosure is not limited thereto, and may be formed to be asymmetrical in the front-rear direction.

Further, in this embodiment, the holes (the portions engaging with the convex portions 51b, 71b, and 71c) of the support member 40 are the elongated holes 41a, 41b, and 41c. However, the holes are not limited to elongated holes and may be other holes (for example, round holes).

What is claimed is:

1. A straightening plate mounting structure comprising:
a support member which is formed with a hole; and
a straightening plate which is formed in a plate shape having a convex portion engageable with the hole and adjusts an air flow in a hood;
wherein
the convex portion is formed in a linear shape with a longitudinal direction extending in a predetermined direction when viewed from a depth direction of the hole, and
the hole is formed in a substantially arc shape when viewed from the depth direction of the hole.

2. The straightening plate mounting structure as claimed in claim 1, wherein the support member is formed with a plurality of holes, and the straightening plate is formed with a plurality of convex portions.

3. The straightening plate mounting structure as claimed in claim 2, further comprising:
a fixing member which is provided at an upper portion of the straightening plate and is fixable to the support member, wherein
the plurality of convex portions are formed at a bottom portion of the straightening plate.

4. The straightening plate mounting structure as claimed in claim 3, wherein
the straightening plate includes
a first plate portion which faces the hood and into which the fixing member is inserted, and
a second plate portion which is adjacent to the first plate portion and is formed to extend toward an outside of the hood from the first plate portion.

5. The straightening plate mounting structure as claimed in claim 4, wherein
the fixing member is formed to be positioned inward of the hood with respect to the second plate portion.

6. A straightening plate mounting structure comprising:
a support member which is formed with a hole; and
a straightening plate which is formed in a plate shape having a convex portion engageable with the hole and adjusts an air flow in a hood;
wherein
the convex portion is formed in a linear shape with a longitudinal direction extending in a predetermined direction when viewed from a depth direction of the hole, and
the hole is formed in a linear shape with a longitudinal direction extending in a direction different from the longitudinal direction of the convex portion when viewed from the depth direction of the hole.

7. The straightening plate mounting structure as claimed in claim 6, wherein the support member is formed with a plurality of holes, and the straightening plate is formed with a plurality of convex portions.

8. The straightening plate mounting structure as claimed in claim 7, further comprising:
a fixing member which is provided at an upper portion of the straightening plate and is fixable to the support member, wherein
the plurality of convex portions are formed at a bottom portion of the straightening plate.

9. The straightening plate mounting structure as claimed in claim 8, wherein
the straightening plate includes
a first plate portion which faces the hood and into which the fixing member is inserted, and
a second plate portion which is adjacent to the first plate portion and is formed to extend toward an outside of the hood from the first plate portion.

10. The straightening plate mounting structure as claimed in claim 9, wherein the fixing member is formed to be positioned inward of the hood with respect to the second plate portion.

11. The straightening plate mounting structure as claimed in claim 6, wherein
the straightening plate is further formed with another convex portion such that longitudinal directions of the convex portions are the same direction, and
the support member is further formed with another hole, and the holes are formed inclined with respect to the longitudinal direction of the convex portions in opposite directions to each other.

12. The straightening plate mounting structure as claimed in claim 7, wherein
longitudinal directions of the convex portions are the same direction, and
the holes are formed inclined with respect to the longitudinal direction of the convex portions in opposite directions to each other.

13. The straightening plate mounting structure as claimed in claim 8, wherein
longitudinal directions of the convex portions are the same direction, and
the holes are formed inclined with respect to the longitudinal direction of the convex portions in opposite directions to each other.

14. The straightening plate mounting structure as claimed in claim 9, wherein
longitudinal directions of the convex portions are the same direction, and
the holes are formed inclined with respect to the longitudinal direction of the convex portions in opposite directions to each other.

15. The straightening plate mounting structure as claimed in claim 10, wherein
longitudinal directions of the convex portions are the same direction, and
the holes are formed inclined with respect to the longitudinal direction of the convex portions in opposite directions to each other.

16. A work vehicle comprising:
the straightening plate mounting structure as claimed in claim 1.

17. A work vehicle comprising:
the straightening plate mounting structure as claimed in claim 6.

* * * * *